(12) United States Patent
Aoki et al.

(10) Patent No.: US 11,590,444 B2
(45) Date of Patent: Feb. 28, 2023

(54) HONEYCOMB FILTER

(71) Applicant: NGK Insulators, Ltd., Nagoya (JP)

(72) Inventors: Takashi Aoki, Yatomi (JP); Yasuyuki Furuta, Konan (JP); Takahiro Honda, Fishers, IN (US); Koji Kuzutani, Konan (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/656,032

(22) Filed: Mar. 23, 2022

(65) Prior Publication Data

US 2022/0401870 A1 Dec. 22, 2022

(30) Foreign Application Priority Data

Jun. 22, 2021 (JP) .............................. JP2021-103264

(51) Int. Cl.
*B01D 46/24* (2006.01)
*B01J 35/04* (2006.01)

(52) U.S. Cl.
CPC ....... *B01D 46/2474* (2013.01); *B01D 46/247* (2013.01); *B01D 46/2429* (2013.01); *B01D 46/2482* (2021.08); *B01D 46/2492* (2021.08); *B01D 46/24491* (2021.08); *B01D 46/24492* (2021.08); *B01J 35/04* (2013.01); *B01D 2279/30* (2013.01)

(58) Field of Classification Search
CPC ............ B01D 46/2474; B01D 46/2429; B01D 46/24491; B01D 46/24492; B01D 46/247; B01D 46/2482; B01D 46/2492; B01D 2279/30; B01J 35/04

USPC .................................. 422/177, 180; 428/116
See application file for complete search history.

(56) References Cited

U.S. PATENT DOCUMENTS

| 4,417,908 | A | * | 11/1983 | Pitcher, Jr. | ............ B01D 46/249 428/116 |
| 9,566,544 | B2 | * | 2/2017 | Iwasaki | .............. B01D 46/2474 |
| 10,918,988 | B2 | * | 2/2021 | Makino | .............. B01D 46/2476 |
| 2011/0239601 | A1 | * | 10/2011 | Tokuda | .................. F01N 3/0222 55/486 |
| 2012/0070346 | A1 | * | 3/2012 | Mizutani | ............ B01D 46/2482 422/178 |
| 2015/0033686 | A1 | | 2/2015 | Shibata et al. | |
| 2015/0260067 | A1 | * | 9/2015 | Kikuchi | ............. B01D 46/2482 427/244 |

(Continued)

FOREIGN PATENT DOCUMENTS

JP  2015-029937 A1  2/2015

*Primary Examiner* — Tom P Duong
(74) *Attorney, Agent, or Firm* — Burr Patent Law, PLLC (57) ABSTRACT

A honeycomb filter includes a pillar-shaped honeycomb substrate having a porous partition wall and a plugging portion provided so as to plug end at any one of the inflow end face side or the outflow end face side of the cell, wherein in a section orthogonal to the extending direction of the cell, the shape of the cell is hexagonal, the partition wall includes a first partition wall disposed between the inflow cell and the outflow cell and a second partition wall disposed between the inflow cells, and the first partition wall has a porous trapping layer on its surface for trapping particulate matter in exhaust gas, and the second partition wall has no trapping layer on its surface or has a trapping layer thinner than the trapping layer disposed on the surface of the first partition wall.

8 Claims, 6 Drawing Sheets

(56) References Cited

U.S. PATENT DOCUMENTS

2016/0271549 A1* 9/2016 Kikuchi .............. C04B 38/0006
2016/0272547 A1* 9/2016 Kikuchi .............. C04B 38/0009

* cited by examiner

HONEYCOMB FILTER

The present application is an application based on JP 2021-103264 filed on Jun. 22, 2021 with Japan Patent Office, the entire contents of which are incorporated herein by reference.

BACKGROUND OF THE INVENTION

Field of the Invention

The present invention relates to a honeycomb filter. More specifically, the present invention relates to a honeycomb filter that has excellent trapping performance for particulate matter in exhaust gas and can effectively suppress an increase in pressure loss during use.

Description of the Related Art

In various industries, internal combustion engines are used as a power source. On the other hand, exhaust gas emitted by the internal combustion engine during the combustion of fuels contains particulate matter such as soot and ashes together with toxic gases such as nitrous oxides. Hereinafter, the particulate matter may be referred to as "PM". The "PM" is an abbreviation for "Particulate Matter". Recently, regulations on removing PM emitted from the diesel engine has become stricter worldwide, as a filter for removing PM, for example, a wall flow type filter having a honeycomb structure is used.

As the wall flow type filter, various honeycomb filters having a honeycomb substrate in which a plurality of cells serving as a fluid through channel are defined by a porous partition wall, and a plugging portion disposed on either open end of the plurality of cells, have been proposed. In such a honeycomb filter, for example, an inflow cell in which the plugging portion is disposed on the outflow end face side, and an outflow cell in which the plugging portion is disposed on the inflow end face side are arranged with the partition wall therebetween, and the porous partition wall for partitioning the inflow cell and the outflow cell serves as a filter for removing PM.

Conventionally, as a honeycomb filter for a diesel engine with a large amount of soot generation, for example, a honeycomb filter having a cell structure including the arrangement of cells in which inflow cells are adjacent to each other in a section orthogonal to the extending direction of the cells of the honeycomb filter, has also been proposed (e.g., see Patent Document 1). In the honeycomb filter having such a cell structure, a partition wall for partitioning an inflow cell and an outflow cell (hereinafter also referred to as "IN-OUT partition wall") and a partition wall for partitioning the inflow cells (hereinafter also referred to as "IN-IN partition wall") exist in a section orthogonal to the extending directions of the cells. The honeycomb filter having such an IN-IN partition wall can greatly reduce pressure loss when particulate matter such as ash is deposited on the partition wall while suppressing an increase in pressure loss in an initial stage of use.

[Patent Document 1] JP-A-2015-29937

SUMMARY OF THE INVENTION

Honeycomb filters for engines of such as automobiles are required to have further trapping performance and low pressure-loss due to the tightening of exhaust gas regulation in the future. Therefore, for the honeycomb filter, it has been considered to apply a HEX-structure in which the capacity of Inlet channel composed of inflow cells is large, and many particulate matters emitted from the engine was accumulated. The "HEX structure" refers to a structure in which the cell shape in the section orthogonal to the extending direction of the cell is configured to be hexagonal. By using such a HEX-structured honeycomb filter, when particulate matter is accumulated, the effective filter volume can be maintained larger than that of the honeycomb filter with square cells when the filters are the same size. Therefore, the honeycomb filter of the HEX-structure can suppress an increase in pressure loss. On the other hand, since the honeycomb filter of the HEX-structure in which the capacity of Inlet channel is large has the IN-IN partition wall described above, when the amount of particulate matter is small, gas is difficult to pass through the IN-IN partition wall, and sufficient performance cannot be exhibited. In order to use the IN-IN partition wall as a gas flow path, a certain amount of soot is deposited on IN-OUT partition wall and the permeation resistance of the IN-OUT partition wall must be high. That is, if the permeation resistance of the IN-OUT partition wall remains low, exhaust gas in the inflow cell preferentially permeates the IN-OUT partition wall. Therefore, the IN-IN partition wall cannot be sufficiently used as the gas flow path until the permeation resistance of the IN-OUT partition wall as described above becomes high to some extent.

In addition, when an IN-IN partition wall is used as a gas flow path, the permeation resistance of the IN-IN partition wall must be reduced in order to effectively use the IN-IN partition wall as the gas flow path, because the gas passing through the IN-IN partition wall moves horizontally in the partition wall with respect to the surface of the partition wall. For example, the permeation resistance of the IN-IN partition wall can be reduced by increasing porosity or increasing pore diameter of the IN-IN partition wall. However, in the honeycomb filter, since the IN-IN partition wall and the IN-OUT partition wall are molded integrally by extrusion, it is difficult to change only pore properties such as porosity of the IN-IN partition wall. For example, if pore properties of the IN-OUT partition wall are the same as the IN-IN partition wall, gas is concentrated on the IN-OUT partition wall until the permeation resistance becomes high due to the deposition of soot, and filtration efficiency for PM is significantly reduced due to the pore property of low-permeation resistance.

Conventionally, there has been proposed a technique of disposing trapping layer for trapping PM on the surface of partition wall of the honeycomb filter. For example, the trapping layers are composed of a porous film having an average pore diameter smaller than the average pore diameter of the partition wall. However, since such a trapping layer requires a raw material and a production time for producing the trapping layer, even if the trapping layer is applied to the honeycomb filter as described above, it is difficult to obtain a satisfactory effect in terms of cost-effectiveness and the like.

The present invention has been made in view of the problems with the prior arts described above. The present invention provides a honeycomb filter that has excellent trapping performance for particulate matter in exhaust gas, can reduce pressure loss in an initial stage of use, and effectively suppress an increase in pressure loss after ash deposition.

According to the present invention, a honeycomb filter described below is provided.

[1] A honeycomb filter including: a pillar-shaped honeycomb substrate having a porous partition wall disposed so as to surround a plurality of cells extending from an inflow end face to an outflow end face; and a plugging portion provided so as to plug end at any one of the inflow end face side or the outflow end face side of the cell, wherein in a section orthogonal to the extending direction of the cell, the shape of the cell is hexagonal, the cells having the plugging portion at ends on the outflow end face side and that are open on the inflow end face side are inflow cells, the cells having the plugging portion at ends on the inflow end face side and that are open on the outflow end face side are outflow cells, the partition wall includes a first partition wall disposed between the inflow cell and the outflow cell and a second partition wall disposed between the inflow cells, and the first partition wall has a porous trapping layer on its surface for trapping particulate matter in exhaust gas, and the second partition wall has no trapping layer on its surface or has a trapping layer thinner than the trapping layer disposed on the surface of the first partition wall.

[2] The honeycomb filter according to [1], which has a cell structure in which a plurality of the inflow cells surround one of the outflow cells.

[3] The honeycomb filter according to [1] or [2], wherein a ratio of a thickness T2 of the trapping layer disposed on the surface of the second partition wall to a thickness T1 of the trapping layer disposed on the surface of the first partition wall is 14% or less.

[4] The honeycomb filter according to any one of [1] to [3], wherein the thickness T1 of the trapping layer disposed on the surface of the first partition wall is 10 to 70 µm.

[5] The honeycomb filter according to any one of [1] to [4], wherein a thickness of the partition wall is 152 to 305 µm.

[6] The honeycomb filter according to any one of [1] to [5], wherein a porosity of the partition wall is 41 to 65%.

[7] The honeycomb filter according to any one of [1] to [6], wherein the trapping layer includes at least one from the group consisting of cordierite, SiC, mullite, aluminum titanate, alumina, silicon nitride, sialon, zirconium phosphate, zirconia, titania, and silica.

[8] The honeycomb filter according to any one of [1] to [7], wherein an average pore diameter of the trapping layer is 0.1 to 10 µm.

The honeycomb filter of the present invention has excellent trapping performance for particulate matter in exhaust gas, can reduce pressure loss in an initial stage of use, and effectively suppresses an increase in pressure loss after ash deposition.

That is, the honeycomb filter of the present invention includes a first partition wall in which a partition wall constituting a honeycomb substrate is disposed between an inflow cell and an outflow cell (i.e., IN-OUT partition wall), and a second partition wall in which the partition wall constituting the honeycomb substrate is disposed between the inflow cells (i.e., IN-IN partition wall). The first partition wall has a porous trapping layer on its surface for trapping particulate matter in exhaust gas. The second partition wall has no trapping layer on its surface or has a trapping layer thinner than the trapping layer disposed on the surface of the first partition wall. In the honeycomb filter thus configured, since it is possible to deposit PM on the surface of the trapping layer disposed on the first partition wall, the PM is hardly clogged in the pore of the partition wall after ash deposition, rapid increase of pressure loss due to clogging of the PM in the pore of the partition wall can be effectively suppressed. Of course, filtration efficiency in trapping PM can also be improved by providing the trapping layer on the first partition wall. Furthermore, by providing the trapping layer preferentially on the surface of the first partition wall, the permeation resistance of the first partition wall is relatively high, and the second partition wall can be effectively used as a gas flow path even in an initial state of use prior to the deposition of particulate matter such as soot. As a result, it is possible to effectively reduce pressure loss in an initial stage of use of the honeycomb filter. For example, with respect to the trapping layer for trapping PM, conventionally, the effect of suppressing rapid increase of pressure loss due to clogging of PM in pore of the partition wall as mentioned first was known, and it is possible to also reduce pressure loss in an initial stage of use by relatively thinning the thickness of the trapping layer in the second partition wall (IN-IN partition wall). By relatively thinning the thickness of the trapping layer in the second partition wall (IN-IN partition wall) relatively small, it is possible to reduce raw materials and production times for producing the trapping layer, and to obtain extremely excellent effects in terms of cost-effectiveness and the like. For example, when the trapping layer is not provided on the second partition wall (IN-IN partition wall), raw materials for producing the trapping layer can be reduced by half, whereas the effect of reducing pressure loss by the trapping layer can be obtained to the same extent as when the trapping layer with uniform thickness is provided for the entire partition wall. That is, the honeycomb filter of the present invention can obtain a high effect far exceeding the reduction amount of raw material for producing the trapping layer and the like.

DESCRIPTION OF THE PREFERRED EMBODIMENTS

Hereinafter, embodiments of the present invention will be described. However, the present invention is not limited to the following embodiments. Therefore, it should be understood that changes, modifications, and the like may be appropriately made to the following embodiments based on ordinary knowledge of a person skilled in the art without departing from the spirit of the present invention.

Figure 1:
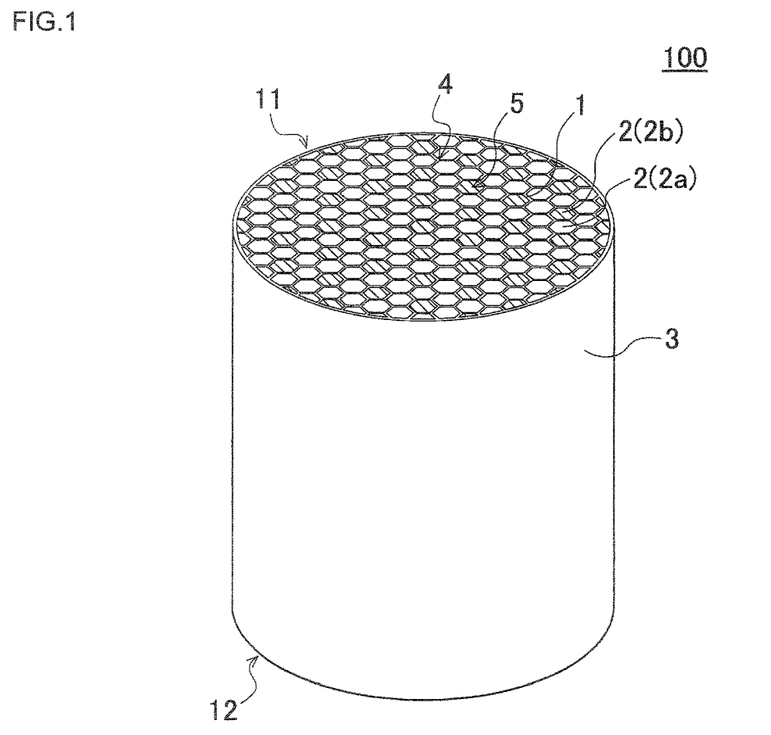
FIG. 1 is a perspective view schematically showing one embodiment of the honeycomb filter of the present invention as viewed from the inflow end face side.
Figure 2:
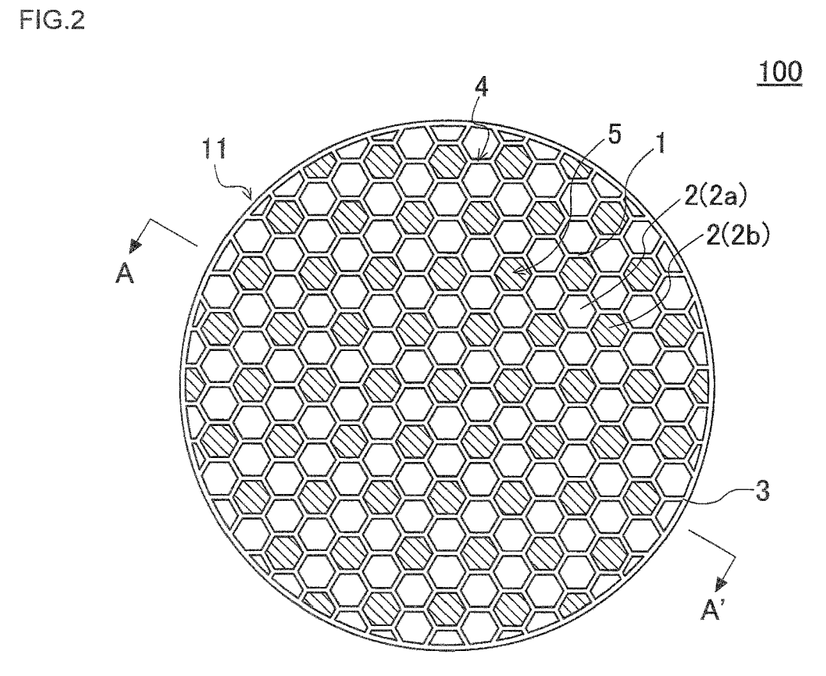
FIG. 2 is a plan view schematically showing the inflow end face of the honeycomb filter shown in FIG. 1.
Figure 3:
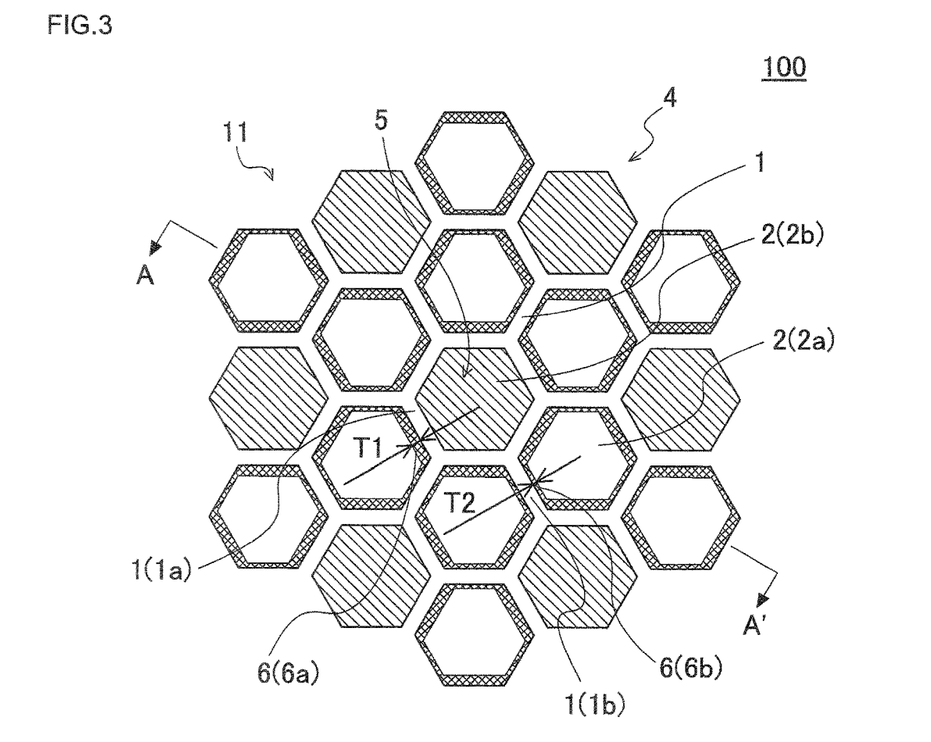
FIG. 3 is an enlarged plan view enlarged a portion of the inflow end face shown in FIG. 2.
Figure 4:
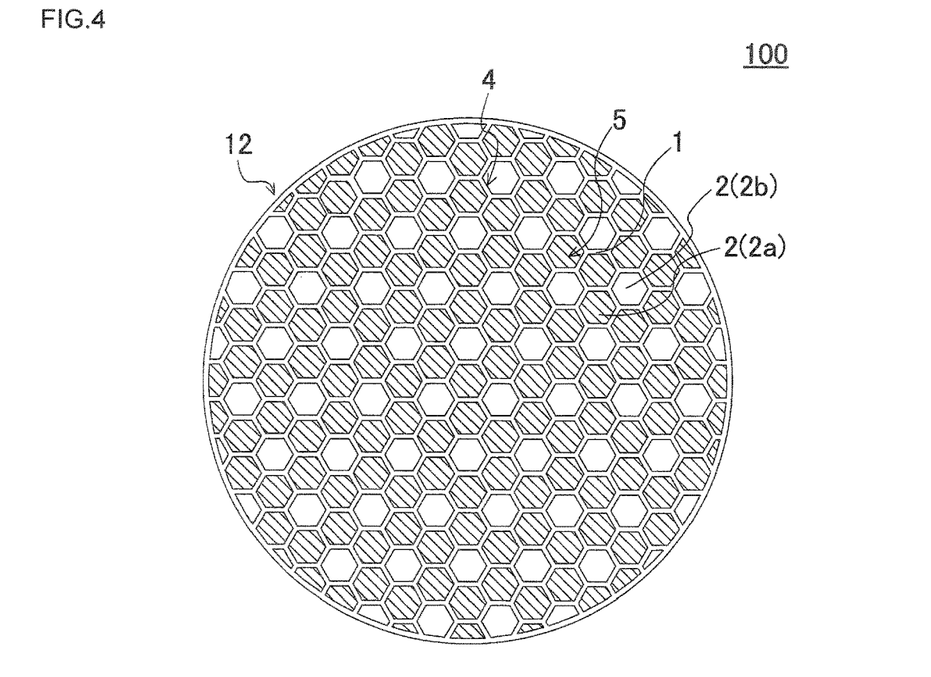
FIG. 4 is a plan view schematically showing the outflow end face of the honeycomb filter shown in FIG. 1.
Figure 5:
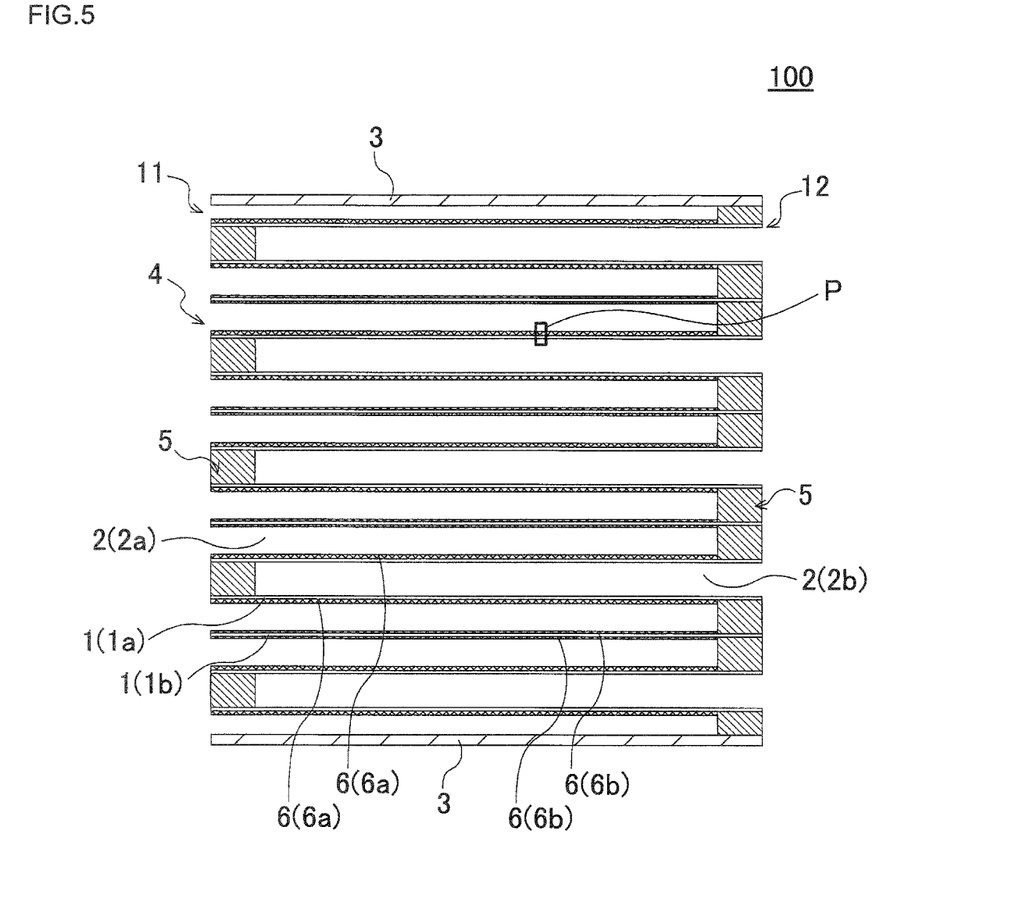
FIG. 5 is a sectional view schematically showing a section taken along the line A-A' of FIG. 2.

(1) Honeycomb Filter:

Referring to FIGS. 1 to 5, one embodiment of the honeycomb filter of the present invention will be described. FIG. 1 is a perspective view schematically showing one embodiment of the honeycomb filter of the present invention as viewed from the inflow end face side. FIG. 2 is a plan view schematically showing the inflow end face of the honeycomb filter shown in FIG. 1. FIG. 3 is an enlarged plan view enlarged a portion of the inflow end face shown in FIG. 2. FIG. 4 is a plan view schematically showing the outflow end face of the honeycomb filter shown in FIG. 1. FIG. 5 is a sectional view schematically showing a section taken along the line A-A' of FIG. 2.

As shown in FIGS. 1 to 5, the honeycomb filter 100 includes a honeycomb substrate 4 and a plugging portion 5. The honeycomb substrate 4 is a pillar-shape having an inflow end face 11 and an outflow end face 12. The honeycomb substrate 4 has a porous partition wall 1 disposed so as to surround a plurality of cells 2 extending from the inflow end face 11 to the outflow end face 12. The honeycomb substrate 4 shown in FIG. 1 and the like further includes a circumferential wall 3 disposed so as to encompass the partition wall 1. In the present invention, the cell 2 refers to a space surrounded with the partition wall 1. The plurality of cells 2 serve as a fluid flow path.

The plugging portion 5 is disposed at either end of the inflow end face 11 side or the outflow end face 12 side of the cell 2 formed in the honeycomb substrate 4, and plugs open end of the cell 2. Hereinafter, the cell 2 in which the plugging portion 5 is disposed at the end of the outflow end face 12 side is referred to as "inflow cell 2a", and the cell 2 in which the plugging portion 5 is disposed at the end of the inflow end face 11 side is referred to as "outflow cell 213".

In the honeycomb filter 100, the shape of the cell 2 is hexagonal in a section orthogonal to the extending direction of the cell 2 of the honeycomb substrate 4. The honeycomb filter 100 has a cell structure in which one inflow cell 2a and another inflow cell 2a are adjacent to each other with the partition wall 1 interposed therebetween. Here, the cell structure means an arrangement pattern of a plurality of cells 2 defined by the porous partition wall 1. That is, the honeycomb filter 100 has an arrangement pattern in which the inflow cells 2a are adjacent to each other with the partition wall 1 interposed therebetween in the arrangement pattern of the cells 2 in the section of the honeycomb substrate 4. In particular, since the shape of the cell 2 of the honeycomb filter 100 is hexagonal, the honeycomb filter 100 preferably has a cell structure in which a plurality of (e.g., six) inflow cells 2a surround one outflow cell 2b.

The partition wall 1 constituting the honeycomb substrate 4 includes a first partition wall 1a disposed between the inflow cell 2a and the outflow cell 2b, and a second partition wall 1b disposed between the inflow cells 2a. In other words, in the cell structure in which the inflow cells 2a and are adjacent to each other as described above, there is a second partition wall 1b as described above as the partition wall 1 that defines the inflow cells 2a in addition to the first partition wall 1a that defines the inflow cell 2a and the outflow cell 2b. Hereinafter, the second partition wall 1b that defines the inflow cells 2a may be referred to as "IN-IN partition wall", and the first partition wall 1a that defines the inflow cell 2a and the outflow cell 2b may be referred to as "IN-OUT partition wall".

In the honeycomb filter 100 of the present embodiment, the first partition wall 1a (i.e., IN-OUT partition wall) has a porous trapping layer 6 on its surface for trapping particulate matter in exhaust gas. On the other hand, the second partition wall 1b (IN-IN partition wall) does not have a trapping layer 6 on its surface or has a trapping layer 6 which is thinner than the trapping layer 6 disposed on the surface of the first partition wall 1a.

Figure 6:
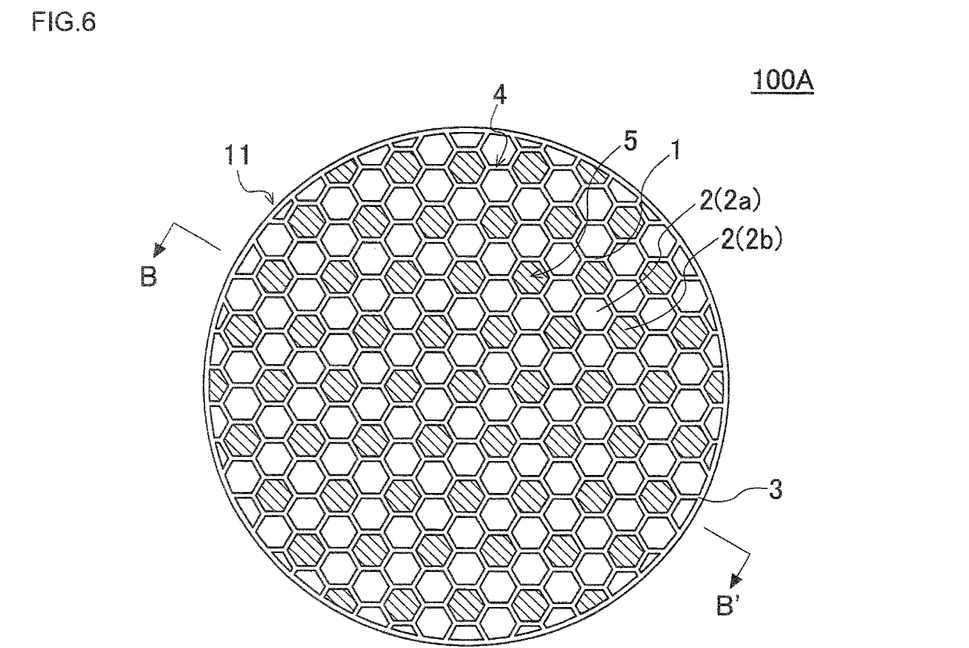
FIG. 6 is a plan view schematically showing the inflow end face of another embodiment of the honeycomb filter of the present invention.
Figure 7:
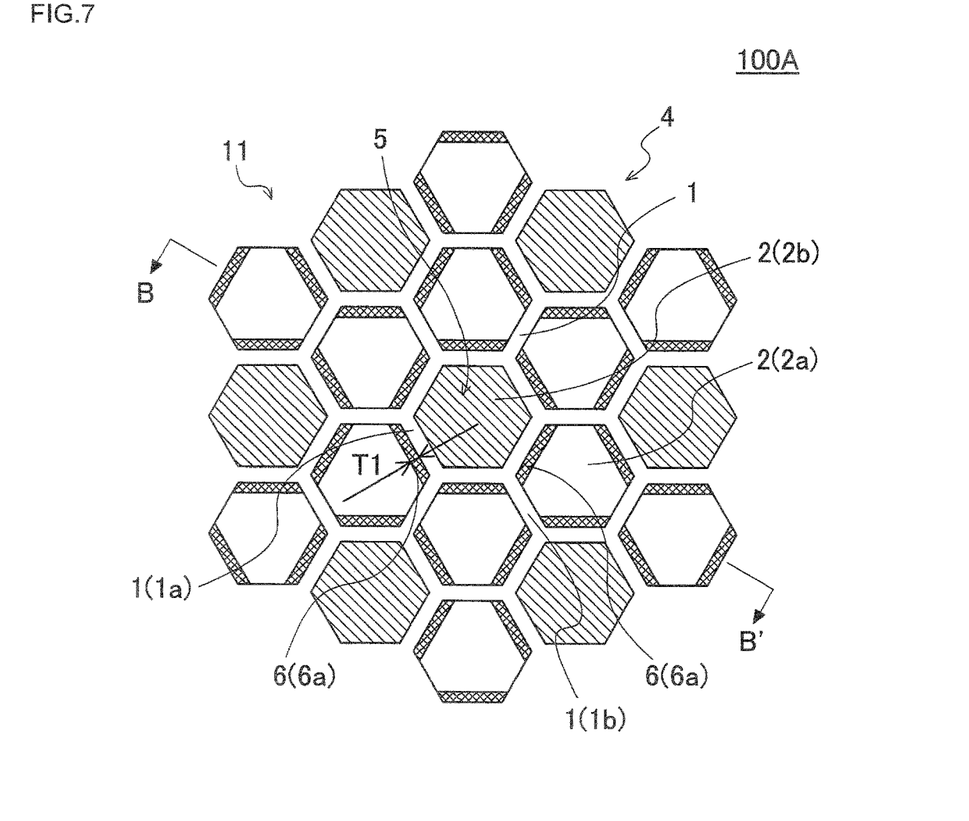
FIG. 7 is an enlarged plan view enlarged a portion of the inflow end face shown in FIG. 6.
Figure 8:
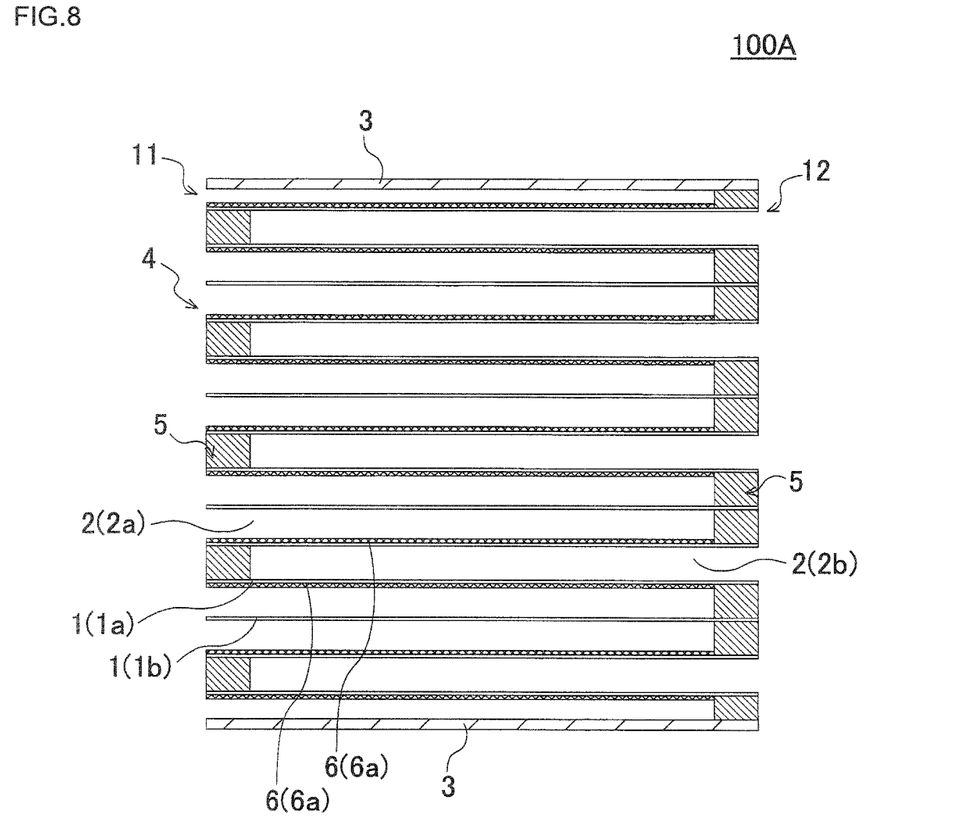
FIG. 8 is a sectional view schematically showing a section taken along the line B-B' of FIG. 6.

For example, in the honeycomb filter 100 shown in FIGS. 1 to 5, the second partition wall 1b (IN-IN partition wall) has a trapping layer 6 (IN-IN trapping layer 6b) which is thinner than the trapping layer 6 disposed on the surface of the first partition wall 1a (IN-OUT trapping layer 6a). Although the honeycomb filter 100 shown in FIGS. 1 to 5 shows an example in which the second partition wall 1b has the trapping layer 6 which is relatively thin on the surface, the second partition wall 1b may not have trapping layer 6 on its surface, for example, as in the honeycomb filter 100A shown in FIGS. 6 to 8. FIG. 6 is a plan view schematically showing the inflow end face of another embodiment of the honeycomb filter of the present invention. FIG. 7 is an enlarged plan view enlarged a portion of the inflow end face shown in FIG. 6. FIG. 8 is a sectional view schematically showing a section taken along the line B-B' of FIG. 6.

Hereinafter, when the honeycomb filter 100 is described with reference to FIGS. 1 to 5, the trapping layer 6 (IN-IN trapping layer 6b), which is relatively thin, on the surface of the second partition wall 1b includes an embodiment in which the second partition wall 1b does not have a trapping layer 6 on the surface as shown in FIGS. 6 to 8. That is, as shown in FIG. 3, when the thickness of the IN-OUT trapping layer 6a disposed on the surface of the first partition wall 1a is T1 (μm) and the thickness of the IN-IN trapping layer 6b disposed on the surface of the second partition wall 1b, the honeycomb filter 100 may be configured as follows. First, when the IN-IN trapping layer 6b substantially exists, the thickness T2 (μm) of the IN-IN trapping layer 6b needs to be smaller than the thickness T1 (μm) of the IN-OUT trapping layer 6a. However, since the embodiment in which the IN-IN trapping layer 6b is substantially not present is included, the minimum thickness T2 of the IN-IN trapping layer 6b is 0 μm of when the IN-IN trapping layer 6b does not exist.

In the honeycomb filter 100, since it is possible to deposit PM on the surface of the trapping layer 6 disposed on the first partition wall 1a, the PM is hardly clogged in pore of the first partition wall 1a after ash deposition. Therefore, rapid increase of pressure loss due to clogging of the PM in the pore of the first partition wall 1a can be effectively suppressed. Of course, filtration efficiency in trapping PM can also be improved by providing the trapping layer 6 on the first partition wall 1a. Furthermore, by providing the trapping layer 6 preferentially on the surface of the first partition wall 1a, the permeation resistance of the first partition wall 1a is relatively high, and the second partition wall 1b can be effectively used as a gas flow path even in an initial state of use prior to the deposition of particulate matter such as soot. As a result, it is possible to effectively reduce pressure loss in an initial stage of use of the honeycomb filter 100. For example, with respect to the trapping layer 6 for trapping PM, conventionally, the effect of suppressing rapid increase of pressure loss due to clogging of PM in pore of the partition wall 1 was known, and it is possible to also reduce pressure loss in an initial stage of use by relatively thinning the thickness of the trapping layer 6b in the second partition wall 1b (i.e., IN-IN partition wall). By relatively thinning the thickness of the trapping layer 6b in the second partition wall 1b, it is possible to reduce raw materials and production times for producing the trapping layer 6, and to obtain extremely excellent effects in terms of cost-effectiveness and the like. For example, when the trapping layer 6 is not disposed on the second partition wall 1b, raw materials for producing the trapping layer 6 can be reduced by half, whereas the effect of reducing pressure loss by the trapping layer 6 (in particular, IN-OUT trapping layer 6a) can be obtained to the same extent as when the trapping layer 6 with uniform thickness is provided with respect to the entire partition wall 1. That is, the honeycomb filter 100 can obtain a high effect far exceeding the reduction amount of the raw materials for producing the trapping layer 6.

The trapping layer 6 is a layer for trapping and removing PM contained in exhaust gas, and is disposed on the surface of the partition wall 1. The trapping layer 6 is preferably formed on the partition wall 1 with the particle groups composed of the particles having an average particle size smaller than the average pore diameter of the partition wall 1. With this configuration, the average pore diameter of the trapping layer 6 can be made smaller than the average pore diameter of the partition wall 1, and PM can be trapped well on the trapping layer 6. The average particle diameter of raw material particles constituting the trapping layer 6 is preferably 0.1 µm or more and 10 µm or less. For example, by setting the average particle diameter to 0.1 µm or more, it is possible to sufficiently secure the size of the space between the particles constituting the trapping layer 6, and it is possible to suppress a rapid increase in pressure loss of the honeycomb filter 100 while maintaining the permeability of the trapping layer 6. By setting the average particle diameter to 10 µm or less, it is possible to sufficiently secure the contacting points between the particles, to increase the bonding strength between the particles, and to effectively suppress the peeling of the trapping layer 6 from the partition wall 1.

The material of the trapping layers 6 is not particularly limited, and examples thereof include one or more inorganic materials selected from the group consisting of cordierite, SiC, mullite, aluminum titanate, alumina, silicon nitride, sialon, zirconium phosphate, zirconia, titania, and silica. The trapping layer 6 may be formed of the same kind of material as the partition wall 1 or may be formed of different materials. Further, the trapping layer 6 may be one containing an inorganic fiber of ceramic or metal. For example, the trapping layer 6 may contain 70% by mass or more of inorganic fiber of ceramic or metal. With this configuration, it becomes easier to trap PM by fiber. The average particle diameter of raw material particles is defined as the median diameter (D50) obtained by measuring raw material particles using a laser diffraction/scattering type particle size distribution measuring device using water as a dispersing medium.

The average pore diameter of the trapping layer 6 is preferably 0.1 to 10 µm, particularly preferably 0.5 to 3.5 µm. With this configuration, it is possible to trap PM well in the trapping layer 6.

The porosity of the trapping layer 6 is preferably 50 to 90%, particularly preferably 60 to 90%. If the porosity of the trapping layer 6 is less than 50%, pressure loss may increase. On the other hand, if the porosity of the trapping layers 6 exceeds 90%, filtration efficiency may deteriorate.

The porosity and the average pore diameter of the trapping layer 6 can be measured in the following manner First, the sectional portion of the trapping layer 6 is observed by a scanning electron microscope (SEM) to acquire the SEM image. The SEM image is observed at a magnification of 200 times. Next, the acquired SEM image is subjected to image analysis to binarize the actual portion of the trapping layer 6 and the void portion in the trapping layer 6. Then, the percentage of the ratio of the void portion in the trapping layer 6 to the total area of the substantial portion and the void portion of the trapping layer 6 is calculated, and the percentage is defined as the porosity of the trapping layer 6. Separately, the voids between the particles in the SEM image are binarized, the size of the voids is directly measured by a scale, and the pore diameter in the trapping layer 6 is calculated from the measured value. The calculated average pore diameter is the average pore diameter of the trapping layers 6.

For the thickness of the trapping layer 6, the thickness T1 of the IN-OUT trapping layer 6a disposed on the surface of the first partition wall 1a may be larger than the thickness T2 of the IN-IN trapping layer 6b disposed on the surface of the second partition wall 1b. The thickness of each of the IN-OUT trapping layer 6a and the IN-IN trapping layer 6b is not particularly limited, and for example, the ratio of the thickness T2 of the IN-IN trapping layer 6b to the thickness T1 of the IN-OUT trapping layer 6a is preferably 14% or less, and more preferably 10% or less. In the honeycomb filter 100, since the IN-IN trapping layer 6b is an optional component, the lower limit of the above ratio is 0% of when the IN-IN trapping layer 6b does not exist.

As described above, the specific thickness of the thickness T1 of the IN-OUT trapping layer 6a is not particularly limited. For example, the thickness is preferably 10 to 70 µm, and particularly preferably 10 to 40 µm. By setting the thickness T1 of the IN-OUT trapping layer 6a to 10 µm or more, it is possible to effectively improve trapping performance of PM when exhaust gas permeates at a high flow rate. On the other hand, by setting the thickness T1 of the IN-OUT trapping layers 6a to 70 µm or less, it is possible to more effectively suppress an increase in pressure loss when PM is trapped.

Figure 9:
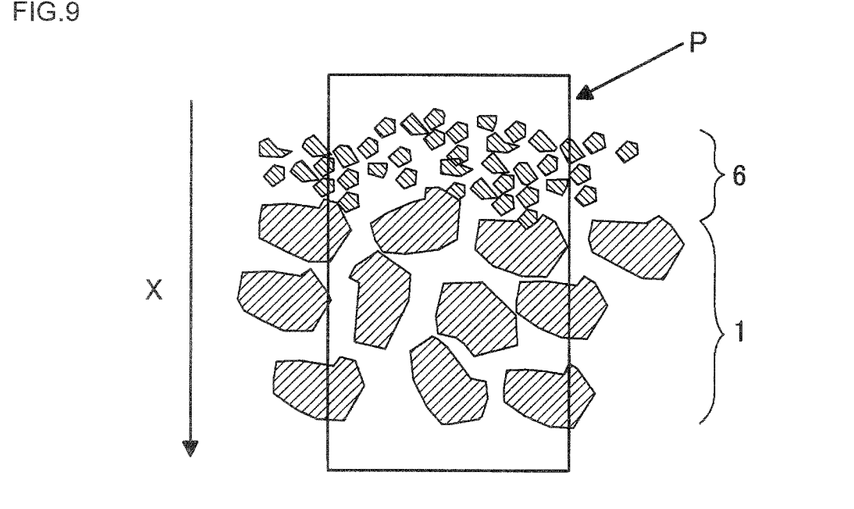
FIG. 9 is an enlarged sectional view enlarged a portion of the partition wall and the trapping layer shown in FIG. 5.

The thickness of the trapping layer 6 (IN-OUT trapping layer 6a and trapping layer 6b) can be measured as follows. First, the honeycomb filter 100 is cut along a plane parallel to the extending direction of the cell 2 to expose a section of the honeycomb filter 100 as shown in FIG. 5. Next, the section of the honeycomb filter 100 was polished to observe the polished surface of the partition wall 1 and the trapping layers 6. In the observation of the polished surface, among the section (polished surface) of the partition wall 1 and the trapping layer 6, the field of view including both the trapping layer 6 and the partition wall 1 (e.g., the area indicated by "P" in FIG. 9) is photographed by SEM. Then, the captured SEM photograph is binarized based on the difference in luminance between the solid portion and the void portion. FIG. 9 is an enlarged sectional view enlarged a portion of the partition wall and the trapping layer shown in FIG. 5.

Figure 10:
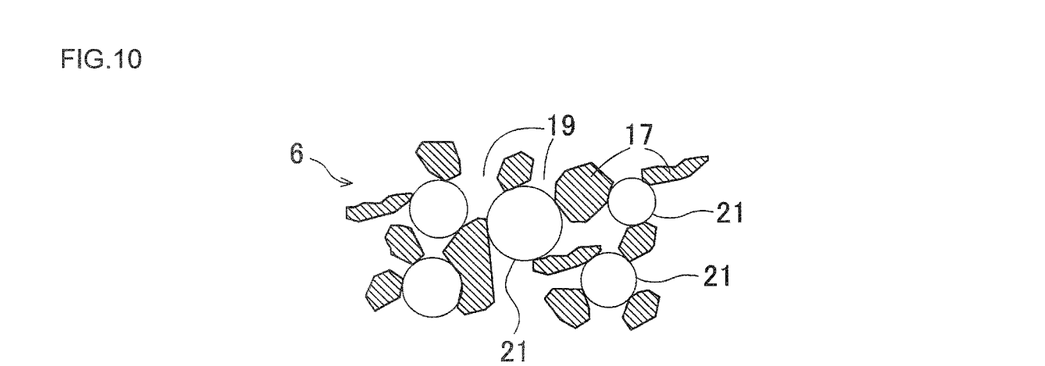
FIG. 10 is an enlarged sectional view further enlarged a portion of the trapping layer shown in FIG. 9.

Next, as shown in FIG. 10, a circle inscribed at the boundary between the solid portion 17 and the void portion 19 (inscribed circle 21) is assumed. Then, the diameter and position of these inscribed circles 21 are plotted toward the partition wall 1 (see FIG. 9) side from the trapping layer 6 (see FIG. 9) side (toward the X direction shown in FIG. 9). In this manner, a scatter diagram in the graph as shown in FIG. 11 is created.

Figure 11:
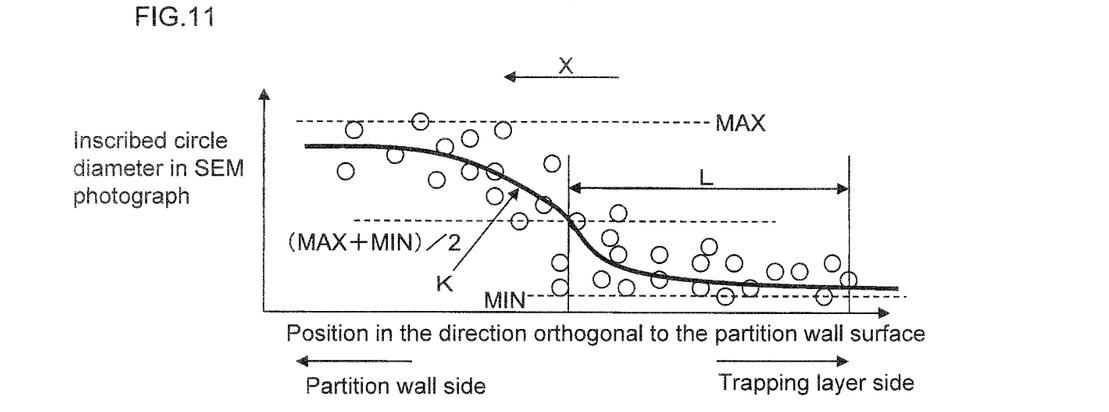
FIG. 11 is a graph showing the relation between the position in the direction orthogonal to the surface of the partition wall and the scanning electron microscopy (SEM) photograph inscribed circle diameter.

For the scatter diagram in the graph as shown in FIG. 11, a cubic curve K is obtained by the least square approximation. Next, the depth (trapping layer depth L) at which the least square approximate cubic curve K intersects the line of the average of the maximum diameter (MAX) and the minimum diameter (MIN) of the inscribed circle 21 (see FIG. 10) in the binarized processed image is measured for 20 fields or more. Then, the average value of the measured trapping layer depth L is calculated, and the calculated average value is set as the thickness of the trapping layer 6 (see FIG. 9). FIG. 10 is an enlarged sectional view further enlarged a portion of the trapping layer shown in FIG. 9. FIG. 10 shows a state in which a circle inscribed at the boundary between the solid portion 17 and the void portion 19 (inscribed circle 21) is drawn. FIG. 11 is a graph showing the relation between the position in the direction orthogonal to the partition wall surface and the inscribed circle diameter in SEM photograph. The "direction orthogonal to the partition wall surface" is, for example, the thickness direction of the partition wall (X direction shown in FIG. 9). The "inscribed circle diameter in SEM photograph" is the diameter of the inscribed circle in the binarized processed image of the scanning electron microscope photograph.

As described above, the thickness of the trapping layer 6 (IN-OUT trapping layer 6a and IN-IN trapping layer 6b) can be obtained. The boundary of the trapping layer 6 and the partition wall 1 is the depth (position) at which the least square approximate cubic curve of the graph as shown in FIG. 11 intersects the line of the average value of the maximum diameter and the minimum diameter of the inscribed circle 21 (see FIG. 10). Thus, the trapping layer 6 is an area from the surface of the trapping layer 6 constituting the cell 2 to the above-mentioned boundary. The graph as shown in FIG. 11 can be created by plotting the diameter of the inscribed circle inscribed on the boundary of the solid portion and the void portion and calculating the least square approximation cubic curve, after the SEM photograph of the section of the honeycomb filter was binarized by the difference in luminance, as described above.

In the honeycomb filter 100 shown in FIGS. 1 to 5, the shape of the inflow cell 2a and the shape of the outflow cell 2b are both hexagonal in a section of the honeycomb substrate 4. Hereinafter, "the shape of the cell 2" in a section orthogonal to the extending direction of the cell 2 of the honeycomb substrate 4 may be referred to as "the sectional shape of the cell 2" or simply "the shape of the cell 2". In the present specification, the "hexagonal" includes a hexagon, a shape in which at least one corner of the hexagon is formed in a curved shape, and a shape in which at least one corner of the hexagon is chamfered in a straight line. The shape of the inflow cell 2a and the shape of the outflow cell 2b are preferably regular hexagons.

In the honeycomb filter 100, the thickness of the partition wall 1 is preferably 152 to 305 µm, and particularly preferably 152 to 267 µm. With this configuration, the honeycomb filter 100 with low pressure loss while maintaining isostatic strength can be obtained. The thickness of the partition wall 1 is the length in the direction orthogonal to the surface of the partition wall 1 partitioning the two cells 2 in a section of the honeycomb substrate 4. The thickness of the partition wall 1 can be measured using, for example, a microscope. As the microscope, for example, VHX-1000 (trade name) manufactured by KEYENCE Co., Ltd., can be used.

In the honeycomb filter 100, the porosity of the partition wall 1 of the honeycomb substrate 4 is preferably 41 to 65% and particularly preferably 41 to 60%. If the porosity of the partition wall 1 is too low, pressure loss may be increased, whereas, if the porosity of the partition wall 1 is too high, the strength of the honeycomb substrate 4 becomes insufficient and it may be difficult to hold the honeycomb filter 100 with a sufficient gripping force when housing the honeycomb filter 100 in the can body used in exhaust gas purification device. The porosity of the partition wall 1 is measured by a mercury porosimeter. As the mercury porosimeter, for example, Autopore 9500 (trade name) manufactured by Micromeritics can be used.

In the honeycomb filter 100, the cell density of the honeycomb substrate 4 is preferably 31 to 62 cells/cm', more preferably 46 to 62 cells/cm$^2$, and particularly preferably 46 to 56 cells/cm'. With this configuration, the honeycomb filter can be suitably used as a filter for trapping PM in exhaust gas emitted from engines of automobiles or the like.

Although there is no particular limitation on the average pore diameter of the partition wall 1, it is preferably 9 to 20 µm, and more preferably 9 to 13 µm. The average pore diameter of the partition wall 1 is measured by a mercury porosimeter. As the mercury porosimeter, for example, Autopore 9500 (trade name) manufactured by Micromeritics can be used.

From the viewpoints of strength, thermal resistance, durability, and the like, the main component of the materials of the partition wall 1 is preferably various ceramics, metals, and the like of oxides or non-oxides. Specifically, the ceramic is preferably made of a material containing at least one selected from the group of materials consisting of cordierite, mullite, alumina, spinel, silicon carbide, silicon nitride, and aluminum titanate, for example. The metal includes Fe—Cr—Al based metal, metal silicon and the like. It is preferable to use one or more kinds selected from these materials as a main component. From the viewpoint of high strength, high thermal resistance, and the like, it is particularly preferable to use one or more kinds selected from a group of materials consisting of alumina, mullite, aluminum titanate, cordierite, silicon carbide, and silicon nitrate as a main component. As a ceramic material, for example, a composite material obtained by bonding particles of silicon carbide using cordierite as a bonding material may be used. From the viewpoint of high thermal conductivity and high thermal resistance, and the like, silicon carbide or silicon-silicon carbide composite material is particularly suitable. The term "main component" means a component which is present in its component in an amount of 50% by mass or more, preferably 70% by mass or more, and more preferably 80% by mass or more.

Although there is no particular limitation on the material of the plugging portion, those mentioned as the material of the partition wall described above can be suitably used.

There is no particular limitation on the entire shape of the honeycomb filter 100. In the entire shape of the honeycomb filter 100, the shape of the inflow end face 11 and the outflow end face 12 is preferably circular or elliptical, particularly preferably circular. The size of the honeycomb filter 100, for example, the length from the inflow end face 11 to the outflow end face 12 of the honeycomb substrate 4 and the size of the section orthogonal to the extending direction of the cell 2 of the honeycomb substrate 4 are not particularly limited. Each size may be selected as appropriate such that optimum purification performance is obtained when the honeycomb filter 100 is used as a filter for purifying exhaust gas.

The honeycomb filter 100 can be suitably used as a member for purifying exhaust gas of an internal combustion engine. The honeycomb filter 100 may be loaded with a catalyst for purifying exhaust gas on at least one of the surfaces of the partition wall 1 and pores of the partition wall 1 of the honeycomb substrate 4. For example, examples of the catalyst for purifying exhaust gas include an oxidation catalyst, a selective catalytic reduction catalyst, and a threeway catalyst. In particular, the honeycomb filter 100 can be suitably used as an exhaust gas purification filter for purifying exhaust gas from engines of automobiles.

Next, a method of manufacturing the honeycomb filter of the present embodiment will be described. However, the method of manufacturing the honeycomb filter is not limited to the manufacturing method described below.

First, a plastic kneaded material for producing a honeycomb substrate is prepared. The kneaded material for producing the honeycomb substrate can be prepared by adding an additive such as a binder, and water, as appropriate, to a material selected from the group of suitable materials of the aforementioned partition wall as a raw material powder.

The prepared kneaded material is then extruded to obtain a pillar-shaped honeycomb formed body having a partition wall for defining a plurality of cells and a circumferential wall disposed on the outermost circumference. In the extrusion, a die in which a slit of an inverted shape of the honeycomb formed body to be formed is formed on the extruded surface of the kneaded material can be used as the die for the extrusion. The resulting honeycomb formed body may be dried with microwaves and hot air, for example.

Next, a plugging portion is formed by plugging an open end of the cell with a material similar to the material used to manufacture the honeycomb formed body. The method of forming the plugging portion can be performed in accordance with a known method of manufacturing a honeycomb filter.

The resulting honeycomb formed body is then fired to obtain a honeycomb filter precursor with the honeycomb substrate and the plugging portion. The honeycomb filter precursor is a porous substrate before forming a trapping layer on the surface of the partition wall. The firing temperature and the firing atmosphere differ according to the raw material, and those skilled in the art can select the firing temperature and the firing atmosphere that are the most suitable for the selected material.

Next, a trapping layer is formed on the surface of the porous partition wall constituting the honeycomb filter precursor in the following method. First, raw material particles for producing the trapping layer are prepared. Examples of the raw material particles for producing the trapping layer include raw material particles for producing the trapping layer composed of an inorganic material having an average particle diameter (D50) of 0.1 to 10 μm. Next, the trapping layer is formed by a method described below. Note that the method described below is an example of a more specific producing method. First, a gaseous raw material for producing a trapping layer containing a powder such as cordierite raw material is introduced from an inflow end face side of a honeycomb filter precursor, and this raw material for producing a trapping layer is blown into the inflow cell. Examples of the powder contained in the raw material for producing a trapping layer include the cordierite raw material having a particle diameter distribution ranging from 0.5 to 6 nm and an average particle diameter (D50) of 2.7 nm. By blowing the gaseous raw material for producing a trapping layer into the inflow cell, the raw material for producing a trapping layer (the powder such as cordierite raw material) in a floating state is deposited on the surface of the partition wall to form a layer (surface layer) composed of the raw material for producing a trapping layer on the surface of the partition wall. Immediately after the blowing, the raw material for producing a trapping layer adheres preferentially to the first partition wall (IN-OUT partition wall), and the permeation resistance of the first partition wall (IN-OUT partition wall) increases as the raw material particles accumulate. Then, when the permeation resistance of the first partition wall (IN-OUT partition wall) exceeds a predetermined value, the amount of the raw material for producing a trapping layer adhered to the second partition wall (IN-IN partition wall) increases. Therefore, when manufacturing the honeycomb filter of the present embodiment, the supply of the gas as the raw material for producing a trapping layer is stopped prior to the adhesion of a sufficient amount of the raw material particles to the second partition wall (IN-IN partition wall), and the adhesion amount of the raw material particles of the first partition wall (IN-OUT partition wall) is made larger than that of the second partition wall (IN-IN partition wall). That is, prior to the formation of the trapping layer with respect to the second partition wall (IN-IN partition wall) or when the formation of the trapping layer in the second partition wall (IN-IN partition wall) is started, the formation of trapping layer (i.e., the supply of the gas for producing a trapping layer) is terminated at a stage where the thickness of the trapping layer does not exceed the thickness of the trapping layer formed in the first partition wall (IN-OUT partition wall). In this manner, by making the thickness of the trapping layer in the second partition wall relatively thin, it is possible to reduce raw materials and production times for producing a trapping layer, and it is possible to obtain extremely excellent effects in terms of cost effectiveness and the like. For example, when no trapping layer is disposed on the second partition wall, the raw material for producing the trapping layer can be reduced half, whereas the effect of reducing pressure loss by the trapping layer (in particular, IN-OUT trapping layer) can be obtained to the same extent as when the trapping layer with uniform thickness is provided for the entire partition wall.

In this way, a trapping layer composed of raw material particles for producing a trapping layer is formed on the inner surfaces of the partition wall surrounding the inflow cells of the honeycomb filter precursor. As described above, the honeycomb filter of the present invention can be manufactured.

EXAMPLES

The following will describe in more detail the present invention by examples, but the present invention is not at all limited by these examples.

Example 1

As a cordierite forming raw material, alumina, aluminum hydroxide, kaolin, talc, and silica were prepared. To 100 parts by mass of the prepared cordierite forming raw material, 13 parts by mass of pore former, 35 parts by mass of dispersing medium, 6 parts by mass of an organic binder, and 0.5 parts by mass of dispersing agent were added, respectively, and mixed and kneaded to prepare a kneaded material. Water was used as the dispersing medium. Cokes with an average particle diameter of 10 μm was used as the pore former. Hydroxypropyl methylcellulose was used as the organic binder. Ethylene glycol was used as the dispersing agent.

Then, kneaded material was extruded using a predetermined mold, to obtain a honeycomb formed body with the entire shape of columnar (cylindrical). The cell shape of the honeycomb formed body was hexagonal.

The obtained honeycomb formed body was then dried in a microwave dryer and further completely dried in a hot air dryer. Thereafter, the dried honeycomb formed body was adjusted to a predetermined dimension to obtain a honeycomb dried body. Next, a plugging slurry containing cordierite forming raw material was prepared as a material for plugging an open end of the cell of the honeycomb dried body. Then, a mask was provided to the outflow end face side of the honeycomb dry body so as to cover open end of the outflow cell, and the end of the outflow end face side of the honeycomb dried body with the mask was immersed in the pugging slurry to form a plugging portion. Similarly, a mask was provided to the inflow end face side of the honeycomb dried body so that an open end of the inflow cell was covered, and the end of the inflow end face side of the honeycomb dried body with the mask was immersed in the plugging slurry to form a plugging portion. Thereafter, the honeycomb dried body having the plugging portion formed thereon was dried by a hot air dryer, and further fired at 1410 to 1440° C., to obtain a honeycomb filter precursor (honeycomb substrate) before forming a trapping layer.

Next, a trapping layer was formed on the surface of the partition wall of the obtained honeycomb filter precursor in the following manner. First, a gas containing silicon carbide powder (raw material particles) having an average particle diameter of 3.5 μm was introduced from the inflow end face side of the honeycomb filter precursor, and the gas was blown into the inflow cell. In this manner, raw material particles were deposited on the surfaces of the partition wall surrounding the inflow cell. Thereafter, the honeycomb filter precursor was heat-treated for 1 hour at 1300° C., and the raw material particles were fused to the surface of the partition wall to form a trapping layer.

In this way, the honeycomb filter of Example 1 was manufactured. Table 1 shows the configuration of the honeycomb filter of Example 1. The honeycomb filters of Example 1 were evaluated for pressure loss, ash capacity, and trapping layer cost in the following manner. Table 1 shows the results.

forming a trapping layer was shortened and the thickness of the trapping layer was thinned with respect to Example 1.

Examples 3 and 4

In Example 3 and 4, the honeycomb filter precursors (honeycomb substrates) with the porosity and the average pore diameter of the partition wall shown in Table 1 were produced. Then, in the same manner as in Example 1 and 2, a honeycomb filter with a trapping layer formed on the surface of the partition wall was manufactured. Preparation of the porosity and the average pore diameter of the partition wall was performed by adjusting the blending ratio of the raw material for preparing a kneaded material.

Comparative Examples 1, 2, 5, and 6

In Comparative Examples 1, 2, 5, and 6, the honeycomb formed body was produced by extrusion of kneaded material using a die having a cell shape of a HAC shape. HAC is an abbreviation for "High Ash Capacity" and have a cell structure in which the sectional area of the cell that is open at the end of side where exhaust gas flows in (inflow cell) is different from the sectional area of the cell that is open at the other end (the end of the side where exhaust gas flows out) (outflow cell). The sectional area refers to the area of the section when the cell is cut in a plane orthogonal to its longitudinal direction. By making the size (area) of the open end (section) of the inflow cell larger than the size (area) of the open end (section) of the outflow cell, the surface area of the inflow cell on which particulate matters or the like are deposited becomes large. Therefore, an increase in pressure loss can be suppressed compared to a square cell having the same open end of the cell in inflow side and outflow side. The cell structure having a cell shape of the HAC shape may be simply referred to as "HAC structure". Then, the obtained

TABLE 1

| | Partition wall thickness [μm] | Cell density [cells/cm$^2$] | Cell shape | Porosity of Partition wall [%] | Average pore diameter of Partition wall [μm] | Thickness of trapping layer of first partition wall (IN-OUT partition wall) [μm] | Thickness of trapping layer of second partition wall (IN-IN partition wall) [μm] | Pressure loss 0.5 g/L of soot [kPa] | Ash Capacity | Trapping layer Cost |
|---|---|---|---|---|---|---|---|---|---|---|
| Comparative Example 1 | 165.1 | 46.5 | HAC | 41 | 9 | 0 | 0 | Fail | Fail | Good |
| Comparative Example 2 | 165.1 | 46.5 | HAC | 41 | 9 | 40 | 40 | Good | Fail | Acceptable |
| Comparative Example 3 | 165.1 | 49.6 | Hex | 41 | 9 | 0 | 0 | Fail | Good | Good |
| Comparative Example 4 | 165.1 | 49.6 | Hex | 41 | 9 | 40 | 50 | Good | Good | Fail |
| Example 1 | 165.1 | 49.6 | Hex | 41 | 9 | 40 | 20 | Good | Good | Acceptable |
| Example 2 | 165.1 | 49.6 | Hex | 41 | 9 | 40 | 5 | Good | Good | Acceptable |
| Comparative Example 5 | 304.8 | 46.5 | HAC | 65 | 20 | 0 | 0 | Fail | Fail | Good |
| Comparative Example 6 | 304.8 | 46.5 | HAC | 65 | 20 | 40 | 40 | Good | Fail | Acceptable |
| Comparative Example 7 | 304.8 | 49.6 | Hex | 65 | 20 | 0 | 0 | Fail | Good | Good |
| Comparative Example 8 | 304.8 | 49.6 | Hex | 65 | 20 | 40 | 50 | Good | Good | Fail |
| Example 3 | 304.8 | 49.6 | Hex | 65 | 20 | 40 | 20 | Good | Good | Acceptable |
| Example 4 | 304.8 | 49.6 | Hex | 65 | 20 | 40 | 5 | Good | Good | Acceptable |

Example 2

In Example 2, a honeycomb filter was manufactured in such a manner that the blowing time of the raw material for honeycomb formed body of the HAC structure was used to obtain a honeycomb filter precursor (honeycomb substrate) before forming a trapping layer.

In Comparative Examples 1 and 5, a honeycomb filter without a trapping layer was manufactured by omitting a step of forming trapping layer. In Comparative Examples 2 and 6, a trapping layer having a thickness as shown in Table 1 was formed on a surface of partition wall surrounding an inflow cell of a honeycomb filter precursor having a HAC structure.

Comparative Examples 3 and 7

In Comparative Examples 3 and 7, a honeycomb filter without a trapping layer was manufactured by omitting a step of forming a trapping layer with respect to Examples 1 and 3.

Comparative Examples 4 and 8

In Comparative Examples 4 and 8, the honeycomb filters were manufactured in the same manner as in Example 1 and 3, except that the blowing time of the raw material particles for forming a trapping layer was increased to form the trapping layer also on the surface of the second partition wall (IN-IN partition wall) in the forming process of the trapping layer.

(Pressure Loss)

First, a honeycomb filter having an end face diameter of 22.86 cm and a length in the extending direction of the cell of 18.4 cm was mounted on the exhaust pipe of a 6.7 L diesel engine. Then, the engine was operated to deposit PM contained in the exhaust gas emitted at an exhaust gas temperature of 270° C. and a flow rate of 320 kg/h on the honeycomb filter. The pressure was measured by the pressure gauge attached to the front and rear of the honeycomb filter when the PM accumulation amount being 0.5 g/L, to obtain the differential pressure between the front and the rear. The differential pressure was taken as the pressure loss of the honeycomb filter. In the evaluation of the pressure loss, the honeycomb filters of Comparative Examples 1 and 5 having a cell shape of HAC shape and not provided with a trapping layer were used as a reference honeycomb filter as an evaluation criteria of pressure loss. In the evaluation of pressure loss, the honeycomb filter having a same thickness of the partition wall as the reference honeycomb filter was evaluated by the following evaluation criteria. When the pressure loss is reduced by 10% or more with respect to the reference honeycomb filter, it is evaluated as "Good", when the pressure loss is reduced by less than 10% with respect to the reference honeycomb filter, it is evaluated as "Acceptable", and when the pressure loss is equal or more with respect to the reference honeycomb filter, it is evaluated as "Fail".

(Ash Capacity)

In the case of the hexagonal cell shape, the total volume of the inflow cell is increased by arranging the inflow cells around the outflow cell to increase the inflow cells, in which PM and ash discharged from the engine are deposited, compared to the square cell or the HAC cell. If the volume of the inflow cell is large, it is possible to suppress a decrease in the filter capacity due to ash deposited on the filter. In the evaluation of the ash capacity, based on the honeycomb filter of the HAC cell, when the total volume of the inflow cell is large, it is evaluated as "Good", and when the total volume is the same, it is evaluated as "Fail".

(Trapping Layer Cost)

In the evaluation of trapping layer cost, the cost of materials used for the trapping layer and the process time required for forming the trapping layer were evaluated as follows. In the case of without the trapping layer, it is evaluated as "Good". When the thickness of the trapping layer is set to 70 μm, in each of Examples and Comparative examples, when the amount of raw material used for forming the trapping layer is 50% or less, it is evaluated as "Acceptable", and when the amount of raw material used for forming the trapping layer is more than 50%, it is evaluated as "Fail".

(Results)

The honeycomb filters of Examples 1 to 4 gave "Good" or "Acceptable" evaluation results in the evaluation of pressure loss, ash capacity, and trapping layer cost, and showed better characteristics than the honeycomb filters of HAC cells. On the other hand, the honeycomb filters of Comparative Examples 1, 3, 5, and 7 were evaluated as "Fail" in the evaluation of pressure loss because they were not provided with trapping layers. The honeycomb filters of Comparative Examples 2 and 6 in which the thicknesses of trapping layers of the first partition wall and the second partition wall were the same, were evaluated as "Fail" in the evaluation of ash capacity. In addition, the honeycomb filters of Comparative Examples 4 and 8 in which the thickness of trapping layer of the second partition wall was increased were evaluated as "Fail" in the evaluation of trapping layer cost.

INDUSTRIAL APPLICABILITY

The honeycomb filter of the present invention can be used as a filter for purifying exhaust gas.

DESCRIPTION OF REFERENCE NUMERALS

1: partition wall, 1a: first partition wall, 1b: second partition wall, 2: cell, 2a: inflow cell, 2b: outflow cell, 3: circumferential wall, 4: honeycomb substrate, 5: plugging portion, 6: trapping layer, 6a: trapping layer (IN-OUT trapping layer), 6b: trapping layer (IN-IN trapping layer), 11: inflow end face, 12: outflow end face, 17: solid portion, 19: void portion, 21: inscribed circle, 100: honeycomb filter, K: cubic curve (least square approximation cubic curve), L: trapping layer depth, T1: trapping layer thickness, T2: trapping layer thickness.

What is claimed is:

1. A honeycomb filter comprising: a pillar-shaped honeycomb substrate having a porous partition wall disposed so as to surround a plurality of cells extending from an inflow end face to an outflow end face; and a plugging portion provided so as to plug end at any one of the inflow end face side or the outflow end face side of the cell, wherein in a section orthogonal to the extending direction of the cell, the shape of the cell is hexagonal, the cells having the plugging portion at ends on the outflow end face side and that are open on the inflow end face side are inflow cells, the cells having the plugging portion at ends on the inflow end face side and that are open on the outflow end face side are outflow cells, the partition wall comprises a first partition wall disposed between the inflow cell and the outflow cell and a second partition wall disposed between the inflow cells, and the first partition wall has a porous trapping layer on its surface for trapping particulate matter in exhaust gas, and the second partition wall has no trapping layer on its surface or has a trapping layer thinner than the trapping layer disposed on the surface of the first partition wall.

2. The honeycomb filter according to claim 1, which has a cell structure in which a plurality of the inflow cells surround one of the outflow cells.

3. The honeycomb filter according to claim 1, wherein a ratio of a thickness T2 of the trapping layer disposed on the surface of the second partition wall to a thickness T1 of the trapping layer disposed on the surface of the first partition wall is 14% or less.

4. The honeycomb filter according to claim 1, wherein the thickness T1 of the trapping layer disposed on the surface of the first partition wall is 10 to 70 μm.

5. The honeycomb filter according to claim 1, wherein a thickness of the partition wall is 152 to 305 μm.

6. The honeycomb filter according to claim 1, wherein a porosity of the partition wall is 41 to 65%.

7. The honeycomb filter according to claim 1, wherein the trapping layer comprises at least one from the group consisting of cordierite, SiC, mullite, aluminum titanate, alumina, silicon nitride, sialon, zirconium phosphate, zirconia, titania, and silica.

8. The honeycomb filter according to claim 1, wherein an average pore diameter of the trapping layer is 0.1 to 10 μm.

* * * * *